United States Patent [19]

Takeuchi

[11] Patent Number: 5,091,468
[45] Date of Patent: Feb. 25, 1992

[54] ORGANOSILANE COATING COMPOSITION

[75] Inventor: Eizi Takeuchi, Tokyo, Japan

[73] Assignee: T.S.B. Ltd., Tokyo, Japan

[21] Appl. No.: 471,349

[22] Filed: Jan. 29, 1990

[30] Foreign Application Priority Data

Jul. 3, 1989 [JP] Japan ............................ 1-169793

[51] Int. Cl.$^5$ ............................................. C08K 5/06
[52] U.S. Cl. ................................... 524/761; 524/765; 524/770; 524/773; 524/912; 528/10; 528/16; 528/23
[58] Field of Search ............... 524/761, 765, 770, 773, 524/912; 528/16, 10, 23

[56] References Cited

U.S. PATENT DOCUMENTS 4,354,013 10/1982 Kimura .................................. 528/16
5,008,328 4/1991 Nakai et al. ......................... 524/761

Primary Examiner—Melvyn I. Marquis
Attorney, Agent, or Firm—Sughrue, Mion, Zinn, Macpeak & Seas

[57] ABSTRACT

An antistatic coating composition comprising: (a) a first organosilane compound having at least one epoxy group and at least one hydrolyzable alkoxy group; (b) a second organosilane compound having no epoxy group and two or more hydrolyzable alkoxy groups; (c) 2 to 20 wt %, based on the total weight of said first and second organosilane compounds, of aluminum dihydrogenphosphate; and (d) 50 to 500 parts by weight, based on the total weight of said first and second organosilane compounds, of an organic solvent for said first and second organosilane compounds.

The coating composition has a long pot life to be stably stored for a long period of time, and may be coated on any of usual materials including metallic, inorganic and organic materials to form a cured coating film which is excellent in resistance to heat, durability, water-proof property and resistance to chemicals by heating at a relatively low temperature for a short time.

Also provided is an improved process for preparing such a coating composition.

11 Claims, No Drawings

ORGANOSILANE COATING COMPOSITION

BACKGROUND OF THE INVENTION:

1. Field of the Invention

The present invention relates generally to a coating composition.

More particularly, it relates to a novel organosilane coating composition which is adapted to be coated on a metallic materials, such as iron, stainless steel and aluminum or alloys thereof, and other inorganic and organic materials including cement, mortar, glass, wood and synthetic resins to form a cured coating film which is excellent in resistance to heat, durability, water-proof property and resistance to chemicals by heating at a relatively low temperature for a short time.

2. Statement of Related Prior Art

It has hitherto been known a process for preparing a coating composition containing products of hydrolysis and partial condensation of the aforementioned products of partial hydrolysis, wherein silane compound is dissolved in a solvent miscible with water, such as ethanol, and then subjected to hydrolysis and partial condensation by the catalytic action of an acid in the presence of water.

The known acids generally used as the catalyst in the known process include hydrochloric acid, sulfuric acid and phosphoric acid. However, the use of such mineral acids is detrimental to the properties of the resultant coating composition. For example, when hydrochloric acid is used as the catalyst, hydrochloric ions are not incorporated in the condensation product of silane to be left in the form of free ions to cause electrolytic corrosion. On the other hand, when phosphoric acid is used, although phosphoric ions are incorporated in the condensation product of silane, adhesiveness of the resultant coating composition becomes inferior or the storage stability thereof becomes poor to shorten the pot life of the coating composition.

There is a demand for an improved antistatic coating composition which can be stored stably for a long period of time and forms a cured coating film having excellent properties, particularly satisfactory antistatic property and high adhesive strength to protect the material coated therewith reliably.

OBJECTS AND SUMMARY OF THE INVENTION

Accordingly, the primary object of this invention is to provide an antistatic coating composition for forming a cured coating film which is improved in resistance to heat, durability, water-proof property and resistance to chemicals.

Another object of this invention is to provide an antistatic coating composition which is improved in adhesiveness to form a tough coating on a variety of materials including metals and synthetic resins.

A further object of this invention is to provide an antistatic coating composition which can be stored stably for a prolonged period of time and forms an electrically insulating and antistatic coating film by heating at a relatively low temperature.

A still further object of this invention is to provide a process for preparing such a coating composition.

After eager pursuits for preparing an antistatic coating composition, it has been found that an organosilane coating composition having a long pot life and forming a tough coating can be prepared by combining particular hydrolyzable organosilane compounds and then co-polycondensing the products of hydrolysis in the presence compound, preferably in the presence of aluminum dihydrogenphosphate. The hydrolysis and subsequent co-polycondensation take place on the material coated with the coating composition of this invention by heating at a relatively low temperature.

More specifically, this invention provides an antistatic coating composition comprising:

(a) a reaction product of phosphoric acid and an aluminum compound;
(b) a first organosilane compound having at least one epoxy group and at least one hydrolyzable alkoxy group;
(c) a second organosilane compound having two or more hydrolzable alkoxy groups; and
(d) an organic solvent.

In the most preferred embodiment, the reaction product of phosphoric acid and an aluminum compound is aluminum dihydrogenphosphate.

According to a further aspect of this invention, provided is a process for the preparation of an antistatic coating composition containing products of hydrolysis and subsequent polycondensation of first and second organosilane compounds, said first organosilane compound having at least one epoxy group and a hydrolyzable alkoxy group and said second organosilane compound having no epoxy group and two or more hydrolyzable alkoxy groups, and said partial hydrolysis and subsequent polycondensation being carried out in the presence of water, an organic solvent and aluminum dihydrogenphosphate.

DESCRIPTION OF PREFERRED EMBODIMENT

The present invention will now be described in detail.

As aforementioned, the antistatic coating composition of this invention comprises the four components of (a) a first organosilane compound having at least one epoxy group and at least one hydrolyzable alkoxy group; (b) a second organosilane compound having no epoxy group and two or more hydrolyzable alkoxy groups; (c) 2 to 20 wt%, based on the total weight of said first and second oganosilane compounds, of aluminum dihydrogenphosphate; and (d) 50 to 500 parts by weight, based on the total weight of said first and second organosilane compounds, of an organic solvent for said first and second organosilane compounds. The most important features of the invention is the use of aluminum dihydrogenphosphate, which acts as a catalyst for hydrolysis and subsequent co-polycondensation and is incorporated into the molecules of the resultant co-polycondensation product.

Although details of the partial hydrolysis and subsequent co-polycondensation reactions of the first and second organosilane compounds, which take place in the presence of aluminum dihrogenphosphate, have not been fully clarified, it is estimated that the following reactions take place during the heating step effected after the coating composition is coated on a sheet or surface to be coated with the protective coating film.

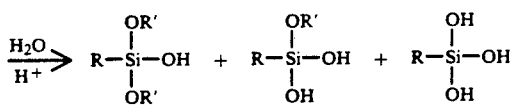

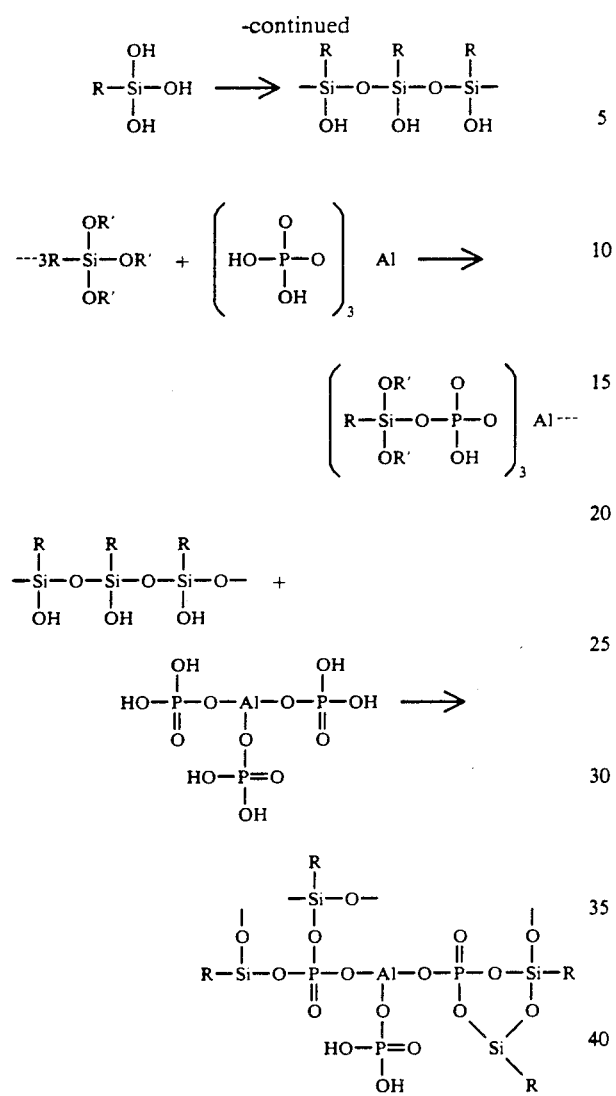

In the reaction formulae set forth above, R and R' each stands for an alkyl group.

When aluminum dihydrogenphosphate ($Al(H_2PO_4)_3$) is used as the catalyst, a commercially available 20 to 50% aqueous solution thereof may be used. The quantity of aluminum dihydrogenphosphate added in the composition of this invention ranges preferably, from 2 to 20% by weight, based on the total weight of the first and second organosilane compounds contained in the composition. If the added quantity of aluminum dihydrogenphosphate is less than 2% by weight, the rates of hydrolysis and subsequent co-polycondensation become too low to increase the period of time required for setting or curing the coating composition; whereas if the added quantity of aluminum dihydrogen-phosphate is more than 20% by weight, the rates of hydrolysis and subsequent co-polycondensation become too high to make it impossible to control the reactions and there arises an adverse tendency of gelation of the coating composition.

The first organosilane compound, which may be used in the present invention, includes those represented by the following formula of:

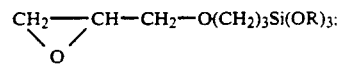

wherein R is an straight-chain alkyl group having 1 to 2 carbon atoms.

Specific examples of the first organosilane compound are as follows:

γ-glycidoxypropyl trimethoxysilane;
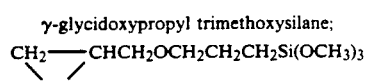

γ-glycidoxypropyl methyldimethoxysilane;
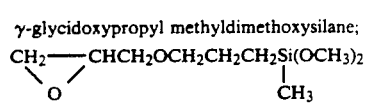

γ-glycidoxypropyl dimethylmethoxysilane;
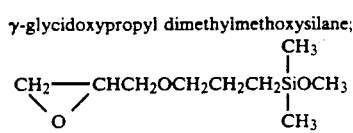

γ-glycidoxypropyl triethoxysilane;
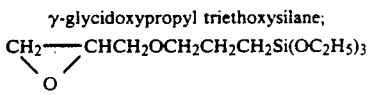

γ-glycidoxypropyl methyldiethoxysilane;
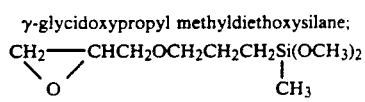

γ-glycidoxypropyl dimethylethoxysilane;
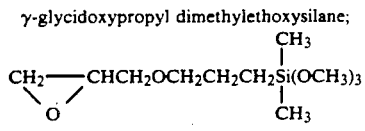

β-(3,4-epoxycyclohexyl)ethyltrimethoxysilane;
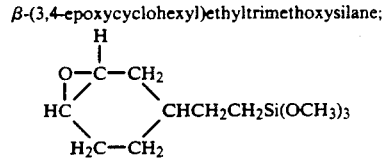

β-(3,4-epoxycyclohexyl)ethylmethyldimethoxysilane;
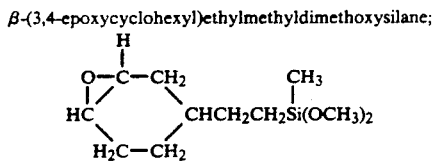

β-(3,4-epoxycyclohexyl)ethyldimethylmethoxysilane;
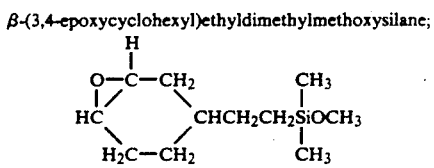

β-(3,4-epoxycyclohexyl)ethyltriethoxysilane;
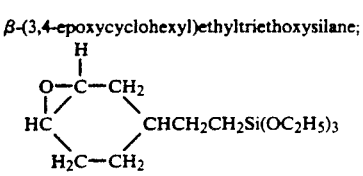

β-(3,4-epoxycyclohexyl)ethylmethyldiethoxysilane;

-continued

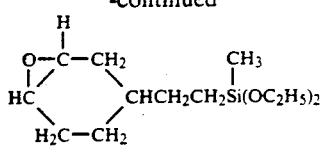

β-(3,4-epoxycyclohexyl)ethyldimethylethoxysilane;

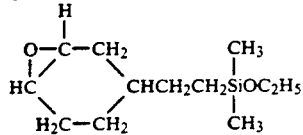

and mixtures thereof.

It is possible to use co-polycondensation products prepared by hydrolysis of any one or more of the first organosilane compounds set forth above and subsequent partial co-polycondensation of the products of the hydrolysis.

The second organosilane compounds, which may be preferably used in the composition of this invention, include those represented by the following formula of:

$$CH_3Si(OR)_3;$$

wherein R is a straight-chain alkyl group having 1 to 2 carbon atoms.

Specific examples of the second organosilane compounds are methyltrimethoxysilane, ethyltrimethoxysilane, phenyltrimethoxysilane, dimethyldimethoxysilane, phenylmethyldimethoxysilane, diphenyldimethoxysilane, methyltriethoxysilane, ethyltriethoxysilane, phenyltriethoxysilane, dimethyldiethoxysilane, phenylmethyldiethoxysilane, diphenyldiethoxysilane, orthomethyl silicate, orthoethyl silicate and mixtures thereof.

It is possible to use co-polycondensation products prepared by hydrolysis of any one or more of the second organosilane compounds set forth above and subsequent partial co-polycondensation of the products of hydrolysis.

The organic solvent used in the composition of this invention is a solvent for the organosilane compounds, the solvent being miscible with water. The organic solvent serves to dissolve and disperse the used catalyst, preferably aluminum dihydrogenphosphate, and to properly control the hydrolysis and subsequent polycondensation reactions. Although it is preferred to use a polar solvent, a mixture of a polar solvent with a non-polar solvent may also be used.

Specific examples of the polar solvent, which may be used in the composition of this invention, are alcohols such as methanol, ethanol, isopropanol, n-butanol and isobutanol; ether alcohols such as ethylene glycol monomethyl ether, ethylene glycol monoethyl ether and ethylene glycol monobutyl ether; esters such as methyl acetate, ethyl acetate, n-propyl acetate, isopropyl acetate, n-butyl acetate, isobutyl acetate, amyl acetate, ethylene glycol monomethyl ether acetate and ethylene glycol monoethyl ether acetate; ketones such as acetone, methyl ethyl ketone, methyl isobutyl ketone and diacetone alcohol; and mixtures thereof. The most preferable polar solvent is methanol, since it is inexpensive and perfectly miscible with water.

Specific examples of preferable non-polar solvents, which may be added to the polar solvent, are hexane, heptane, octane and mixtures thereof. Although an aromatic compound such as toluene and xylene may be added to the polar solvent, it is desirable that the aromatic compound be used as little as possible since the coating composition becomes cloudy when a large amount thereof is added.

The content of the organic solvent ranges preferably from 50 to 500 parts by weight, based on the total weight of the first and second organosilane compounds. If the content of the organic solvent is less than 50 parts by weight, the viscosity of the resultant coating composition becomes too high and the pot life of the composition is shortened. On the contrary, although the pot life of the resultant coating composition can be prolonged by adding 500 parts by weight or more of the organic solvent, the viscosity of the composition becomes too low to make it difficult to form a coating film having a sufficient thickness.

Water contained in the coating composition of this invention is normally supplied as water used for dissolving aluminum dihydrogenphosphate. However, water may be added as desired to prepare a coating composition having a proper viscosity.

EXAMPLE

The present invention will now be described more specifically with reference to an example thereof. However, it is to be noted hereby that the following example is given by way of example only and thus the invention should not be limited thereby, the scope of the invention being defined by the appended claims.

A coating composition was prepared by mixing the components, as will be set forth below, and the mixture was allowed to stand at room temperature for 24 hours:

| | |
|---|---|
| Methyltrimethoxysilane | 25 g |
| γ-Glycidoxypropyltrimethoxysilane | 25 g |
| 50 wt % Aqueous Solution of Aluminum Dihydrogenphosphate | 10 g |
| Methanol | 50 g |

The following are the properties of the thus prepared coating composition and the coating film after curing.

Properties of the Coating Composition:
Sepcific Gravity: 0.939 (at 25° C.)
Viscosity: 3.5 cp. (at 25° C.)
Properties of the Cured Coating Film:

| Condition for Curing | Pencil Hardness |
|---|---|
| 25° C., 1 hr. | 3H |
| 25° C., 24 hrs. | 6H |
| 70° C., 2 hrs. | 5H |
| 100° C., 2 hrs. | 9H |

Surface Resistivity:

The surface resistivity of a cured coating film applied on an acrylic resin plate was measured by the method stipulated in JIS K 6911 to find that the surface resistivity was $1.0 \times 10^{12}$ ohm.cm.

The the coating composition was applied on plates, respectively, made of an ABS resin, PZ, Teflon (Trade Name) and PVC, and the surface resistivities of the cured coating films were measured. The results were substantially equivalent to that of the coating film applied on the acrylic resin plate.

Antistatic Property:

The coating composition was applied on an acrylic resin plate and then cured. The antistatic property of the cured coating film was measured by the JIS L-1094 method to obtain the following results (the results being expressed by the half-value periods of the initial values when an electric potential of 10 KV was applied). The results revealed that the cured coating films formed by the use of the coating composition of the invention exhibited superior antistatic effects. Equivalent results were obtained when the coating composition was applied, respectively, on different substrates made of PVC, PZ, Teflon (Trade Name) and ABS.

| | |
|---|---|
| Normal Condition (25° C., 55% RH*) | 1.0 sec. |
| 25° C., 30% RH* | 5.0 sec. |
| After being treated at 70° for 100 hrs. | 11.9 sec. |

*Note: RH = Relative Humidity

As will be seen from the data given above, the coating composition of the invention forms a cured coating film superior over that obtainable by the conventional technology.

Although the invention has been described with reference to a presently preferred embodiment, many modifications and alternations may be conceived by a person having ordinary skill in the art without departing from the spirit and scope of the invention which is defined in the appended claims.

What is claimed is:

1. An antistatic coating composition comprising:
    (a) a first organosilane compound having at least one epoxy group and at least one hydrolyzable alkoxy group;
    (b) a second organosilane compound having no epoxy group and two or more hydrolyzable alkoxy groups;
    (c) 2 to 20 wt%, based on the total weight of said first and second organosilane compounds, of aluminum dihydrogenphosphate; and
    (d) 50 to 500 parts by weight, based on the total weight of said first and second organosilane compounds, of an organic solvent for said first and second organosilane compounds, wherein said first organosilane compound and said second organosilane compound are present in an amount effective to provide an antistatic coating.

2. The antistatic coating composition according to claim 1, wherein said first organosilane compound is selected from the group consisting of:
    γ-glycidoxypropyl trimethoxysilane,
    γ-glycidoxypropyl methyldimethoxysilane,
    γ-glycidoxypropyl dimethylmethoxysilane,
    γ-glycidoxypropyl triethoxysilane,
    γ-glycidoxypropyl methyldiethoxysilane,
    γ-glycidoxypropyl dimethylethoxysilane,
    β-(3,4-epoxycyclohexyl)ethyltrimethoxysilane,
    β-(3,4-epoxycyclohexyl)ethylmethyldimethoxysilane,
    β-(3,4-epoxycyclohexyl)ethyldimethylmethoxysilane,
    β-(3,4-epoxycyclohexyl)ethyltriethoxysilane,
    β-(3,4-epoxycyclohexyl)ethylmethyldiethoxysilane,
    β-(3,4-epoxycyclohexyl)ethyldimethylethoxysilane,
    and mixtures thereof.

3. The antistatic coating composition according to claim 1, wherein said second organosilane compound is selected from the group consisting of:
    methyltrimethoxysilane, ethyltrimethoxysilane, phenyltrimethoxysilane, dimethyldimethoxysilane, phenylmethyldimethoxysilane, diphenyldimethoxysilane, methyltriethoxysilane, ethyltriethoxysilane, phenyltriethoxysilane, dimethyldiethoxysilane, phenylmethyldiethoxysilane, diphenyldiethoxysilane, orthomethyl silicate, orthoethyl silicate,
and mixtures thereof.

4. The antistatic coating composition according to the claim 1, wherein said organic solvent is a polar solvent.

5. The antistatic coating composition according to claim 4, wherein said polar solvent is selected from the group consisting of alcohols, ether alcohols, esters, ketones, and mixtures thereof.

6. The antistatic coating composition according to claim 4, wherein said polar solvent is selected from the group consisting of methanol, ethanol, isopropanol, n-butanol, isobutanol, ethyleneglycol monomethyl ether, ethyleneglycol monoethyl ether, ethyleneglycol monobutyl ether, methyl acetate, ethyl acetate, n-propyl acetate, isopropyl acetate, n-butyl acetate, isobutyl acetate, amyl acetate, ethyleneglycol monomethyl ether acetate, ethyleneglycol monoethyl ether acetate, acetone, methyl ethyl ketone, methyl isobutyl ketone, diacetone alcohol and mixtures thereof.

7. The antistatic coating composition according to claim 1, wherein said organic solvent is a mixture of a polar solvent and a non-polar solvent.

8. The antistatic coating composition according to claim 7, wherein said non-polar solvent is selected from the group consisting of hexane, heptane, octane, and mixtures thereof.

9. In the process for the preparation of an antistatic coating composition containing products of hydrolysis and subsequent polycondensation of first and second organosilane compounds, said first organosilane compound having at least one epoxy group and at least one hydrolyzable alkoxy group and said second organosilane compound having no epoxy group and two or more hydrolyzable alkoxy groups, and said hydrolysis and subsequent polycondensation being carried out in the presence of water, an organic solvent and a catalyst, the improvement which comprises said catalyst is aluminum dihydrogenphosphate, wherein said first organosilane compound and said second organosilane compound are present in an amount effective to provide an antistatic coating.

10. The improved process according to claim 9, wherein said first organosilane compound is selected from the group consisting of:
    γ-glycidoxypropyl trimethoxysilane,
    γ-glycidoxypropyl methyldimethoxysilane,
    γ-glycidoxypropyl dimethylmethoxysilane,
    γ-glycidoxypropyl triethoxysilane,
    γ-glycidoxypropyl methyldiethoxysilane,
    γ-glycidoxypropyl dimethylethoxysilane,
    β-(3,4-epoxycyclohexyl)ethyltrimethoxysilane,
    β-(3,4-epoxycyclohexyl)ethylmethyldimethoxysilane,
    β-(3,4-epoxycyclohexyl)ethyldimethylmethoxysilane,
    β-(3,4-epoxycyclohexyl)ethyltriethoxysilane,
    β-(3,4-epoxycyclohexyl)ethylmethyldiethoxysilane,
    β-(3,4-epoxycyclohexyl)ethyldimethylethoxysilane,
    and mixtures thereof; and wherein said second organosilane compound is selected from the group consisting of:

methyltrimethoxysilane, ethyltrimethoxysilane, phenyltrimethoxysilane, dimethyldimethoxysilane, phenylmethyldimethoxysilane, diphenyldimethoxysilane,
methyltriethoxysilane, ethyltriethoxysilane, phenyltriethoxysilane, dimethyldiethoxysilane, 11. The improved process according to claim 9, wherein aluminum dihydrogenphosphate is added in the form of an aqueous solution containing 20 to 50% of aluminum dihydrogenphosphate.

* * * * *